(12) United States Patent
Kadlec et al.

(10) Patent No.: US 11,760,173 B2
(45) Date of Patent: Sep. 19, 2023

(54) SAFARI GLASS

(71) Applicant: Canoo Technologies Inc., Torrance, CA (US)

(72) Inventors: Jenna Kadlec, Hermosa Beach, CA (US); Cian John Francis Brogan, Redondo Beach, CA (US); Nathaniel B. Duncan, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 3 days.

(21) Appl. No.: 17/448,497

(22) Filed: Sep. 22, 2021

(65) Prior Publication Data

US 2022/0089002 A1 Mar. 24, 2022

Related U.S. Application Data

(60) Provisional application No. 63/081,810, filed on Sep. 22, 2020.

(51) Int. Cl.
*B60J 1/00* (2006.01)
*B60J 1/14* (2006.01)
*B60J 1/10* (2006.01)

(52) U.S. Cl.
CPC .............. *B60J 1/008* (2013.01); *B60J 1/006* (2013.01); *B60J 1/007* (2013.01); *B60J 1/14* (2013.01); *B60J 1/10* (2013.01)

(58) Field of Classification Search
CPC ..... B60J 1/008; B60J 1/007; B60J 1/14; B60J 1/10
See application file for complete search history.

(56) References Cited

U.S. PATENT DOCUMENTS

| | | | | |
|---|---|---|---|---|
| 1,864,868 A | * | 6/1932 | Soderberg | B60J 1/14 49/350 |
| 2,108,322 A | * | 2/1938 | Thorp | B60J 1/14 49/391 |
| 2,124,696 A | * | 7/1938 | Hall | B60J 1/14 49/67 |
| 2,295,277 A | * | 9/1942 | Wilshusen | B60J 1/14 49/144 |
| 3,492,044 A | * | 1/1970 | Mycroft | B60F 3/0053 114/361 |
| 3,690,696 A | * | 9/1972 | Lincoln | B60R 22/04 280/803 |

(Continued)

FOREIGN PATENT DOCUMENTS

| | | | | |
|---|---|---|---|---|
| EP | 1036681 A1 | * | 9/2000 | B60J 1/14 |

*Primary Examiner* — Jason S Morrow

(57) ABSTRACT

Top side view windows are canted between a vehicle cabin roof and sides along a length of the vehicle, truncating a corner between the roof and sides. The top side view windows may open outwardly from an interior of the cabin, and may open outwardly and upwardly similar to a safari windshield. Hinges and a latch allow movement of the top side view windows, with the latch securing the respective window in an open or closed position. The latch may include a strap with a flexible end wrapping around interior trim, optionally with a magnet at the tip to hold the flexible end in position when wrapped. A rigid portion of the strap holds the window when in the open position, and may include openings receiving protrusions from the interior trim or teeth engaging with a tip of a rachet cam.

20 Claims, 18 Drawing Sheets

(56) References Cited

U.S. PATENT DOCUMENTS

| | | | | |
|---|---|---|---|---|
| 5,791,727 | A | * | 8/1998 | Doescher .................. B60J 1/14 |
| | | | | 296/146.16 |
| 6,033,002 | A | * | 3/2000 | Clare ...................... B60J 10/00 |
| | | | | 296/183.1 |
| 6,694,675 | B1 | * | 2/2004 | Craft ...................... E05C 17/34 |
| | | | | 292/263 |

* cited by examiner

SAFARI GLASS

CROSS-REFERENCE TO RELATED APPLICATIONS

This application claims priority to U.S. Provisional Patent Application No. 63/081,810 filed Sep. 22, 2020 and entitled SAFARI GLASS. The content of the above-identified patent document(s) is incorporated herein by reference.

TECHNICAL FIELD

This disclosure relates generally to vehicle window opening and closing arrangements. More specifically, this disclosure relates to aesthetically pleasing window arrangements providing improved admittance of natural light and fresh air without significantly degrading aerodynamic performance, even if open during vehicle movement.

BACKGROUND

Automobile vehicles may generally be described in relation to a body or cabin designed to enclose passengers, and the various electrical, mechanical and structural systems, subsystems, and components that allow the vehicle to operate. In traditional automobile design, the body and various functional systems and components are inextricably intertwined. Automobile vehicles in general are comprised of many different structural and functional components. Certain structural components may serve to house certain functional elements essential for vehicle operation, while other components can serve as both functional and aesthetic to the appearance of the vehicle. For example, windows can serve several functions such as allowing light to enter the cabin while blocking wind and debris from entering and/or allowing fresh air into the cabin and function as a part of the vehicle's air conditioning system.

Vehicle manufacturers have to consider not only appearance but also function with respect to the exterior of the vehicle, as well. Traditional vehicle manufacturers tend to follow similar trends in window placement and design, such as only in the doors, the front, and the back. Other vehicles include additional moon roofs or sunroofs with some variations that include, for example, dual sunroofs or panoramic sunroofs. Many designs take into account the aerodynamic impact of window placement and design on the vehicle, which can be complex. As a result, many manufactures comply with traditional design parameters and characteristics to avoid potential problems with aerodynamics.

SUMMARY

Top side view windows are canted between a vehicle cabin roof and sides along a length of the vehicle, truncating a corner between the roof and sides. The top side view windows may open outwardly from an interior of the cabin, and may open outwardly and upwardly similar to a safari windshield. Hinges and a latch allow movement of the top side view windows, with the latch securing the respective window in an open or closed position. The latch may include a strap with a flexible end wrapping around interior trim, optionally with a magnet at the tip to hold the flexible end in position when wrapped. A rigid portion of the strap holds the window when in the open position, and may include openings receiving protrusions from the interior trim or teeth engaging with a tip of a rachet cam.

A vehicle cabin includes a cabin roof extending for a portion of a length between a front and a rear of a vehicle, cabin sides extending for a portion of the length between the front and the rear of the vehicle, and one or more top side view or canted safari windows canted between the roof and the sides along a portion of the length between the front and the rear of the vehicle, the one or more windows each configured to open outwardly from an interior of the vehicle and to be secured in an open position and in a closed position.

The one or more windows may include two windows on each side of the vehicle, each window aligned with a passenger door in one of the cabin sides.

At least one of the one or more windows may include a transparent material, a window frame to which the transparent material is secured, the window frame having an opening therethrough, one or more hinges attaching the respective window to a portion of the cabin in a manner allowing rotation of the respective window, and a latch securing the respective window in the open position or the closed position.

The one or more hinges may each be spring-biased to inhibit movement of the window from one of the open position or the closed position.

The transparent material may be glass. The one or more hinges may include two spaced apart hinges secured to a rail of a vehicle body including the cabin. The latch may be secured at one end to the window and at an opposite end to a rail of the vehicle body. Each window may be movable between the open position and the closed position by an occupant.

The latch may include a strap having an elongated body with a first end and a second end, where the first end is connected to the window and the second end extends opposite the first end and is positioned such that the elongated body of the strap rests within a latch housing, with the elongated body of the strap optionally including engagement teeth disposed along a portion of the elongated body and the latch housing optionally including a lever resiliently connected to an opposing engagement tooth and configured to cooperatively engage with the engagement teeth of the strap and to allow movement of the strap within the latch housing.

The strap may include a flexible end configured to be wrapped around interior trim over a rail within the cabin.

A tip of the flexible end may be magnetic to secure the flexible end when wrapped around the interior trim.

The strap may include a rigid segment holding the window in the open position.

The rigid segment may include an encasement providing tactile engagement for an occupant.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 13C, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Traditional front "safari" windshields that open and close upwardly and outwardly are positioned instead and adapted to form canted safari side windows, roof-like glass elements positioned on the canted portion of the vehicle cabin between the roof and sides. The canted safari side windows open and close in a non-traditional manner, such that vehicle aerodynamics is not adversely affected by opening those windows during vehicle movement while a complete seal is maintained by the windows and the associated latching mechanisms when closed, preventing damage to window and vehicle interior (e.g., due to rain).

Figure 1A:
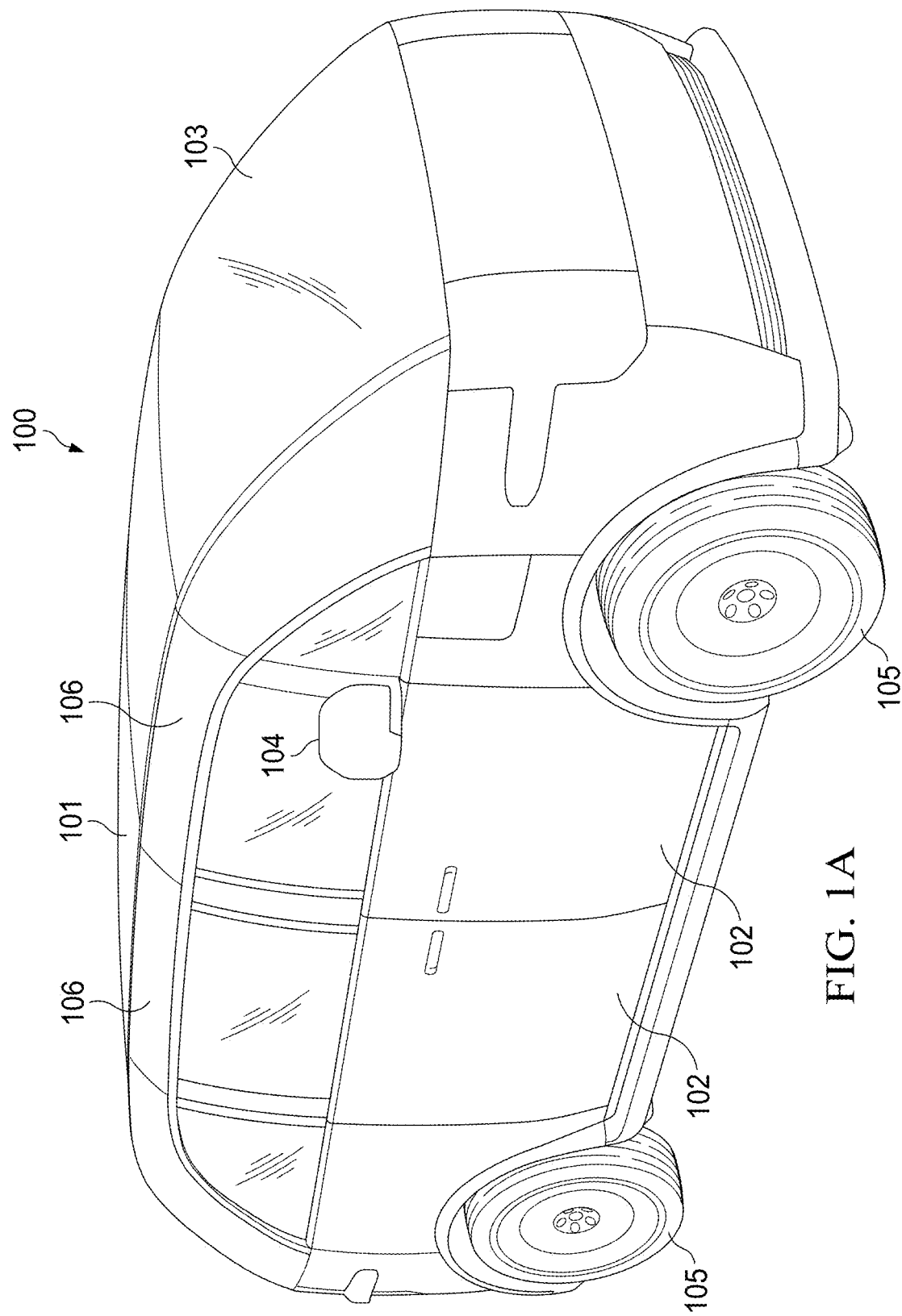
FIG. 1A is a front perspective view.
Figure 1B:
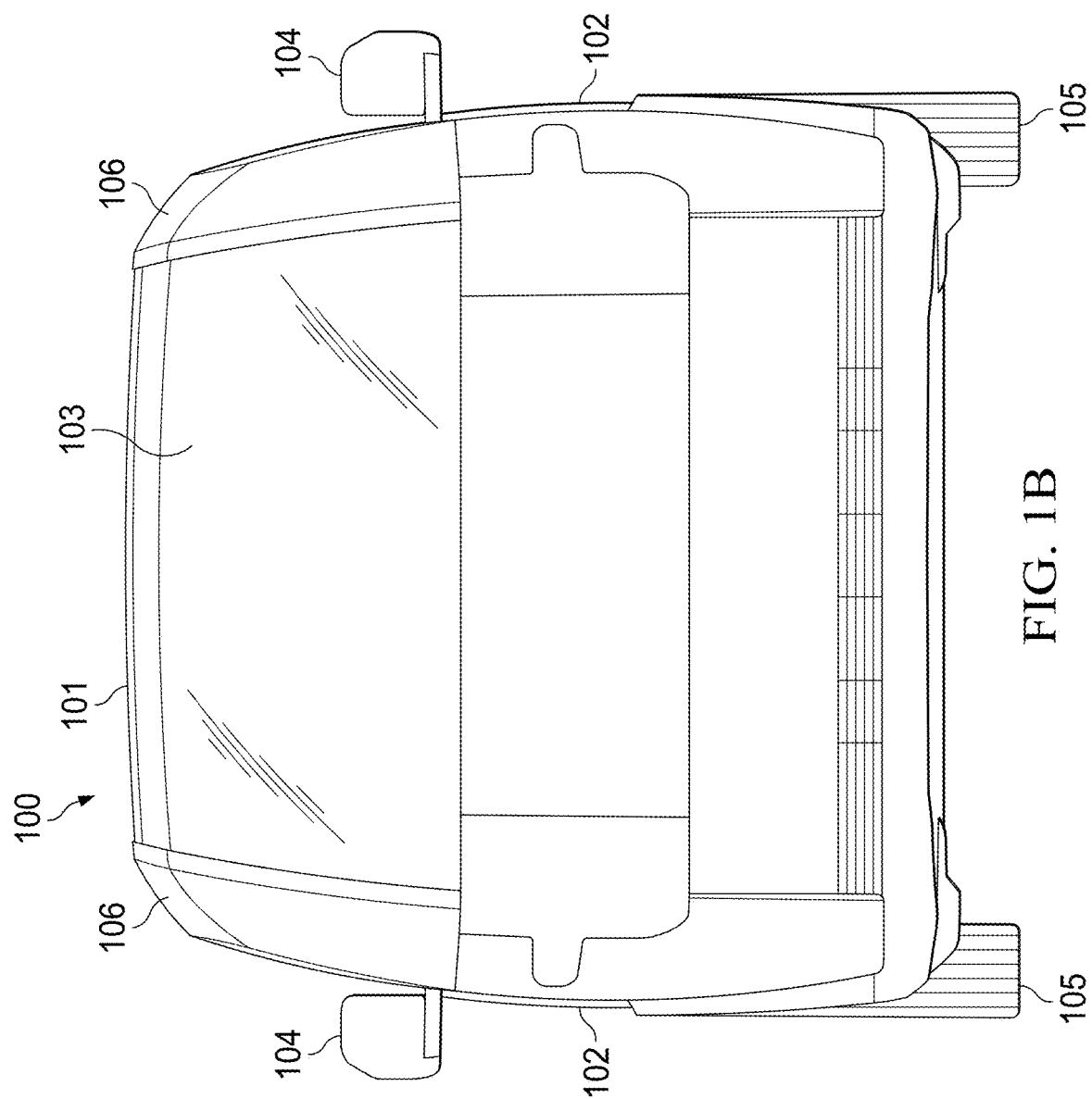
FIG. 1B is a front orthogonal view, of a vehicle within which an improved window arrangement is implemented in accordance with embodiments of the present disclosure.

FIG. 1A is a front perspective view, and FIG. 1B is a front orthogonal view, of a vehicle within which an improved window arrangement is implemented in accordance with embodiments of the present disclosure. The embodiment shown in FIGS. 1A and 1B is for illustration and explanation only. FIGS. 1A and 1B do not limit the scope of this disclosure to any particular vehicle implementation, or exclude variants.

The vehicle 100 of FIGS. 1A and 1B includes a chassis (not visible in FIGS. 1A and 1B) supporting a cabin 101 for carrying passengers. In some embodiments, the vehicle 100 is an electric vehicle (EV) in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an autonomous driving mode) to see outside the cabin 101. Rear view mirrors 104 mounted to sides of the cabin 101 enable the operator to see objects to the sides and rear of the cabin 101 and may include warning indicators (e.g., selectively illuminated warning lights) for features such as blind spot warning (indicating that another vehicle is in the operator's blind spot) and/or lane departure warning.

Wheels 105 mounted on axles that are supported by the chassis and driven by the motor(s) (all not visible in FIGS. 1A and 1B) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

Although FIGS. 1A and 1B illustrate one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIGS. 1A and 1B, and the improved window opening and closing arrangement described in this disclosure may be used with any other suitable vehicle.

The exemplary embodiment includes canted safari windows 106 across the corner of the cabin 101 between the roof and the doors 102. In the example shown, the vehicle 100 includes four canted safari windows 106, two on each side, one over each passenger door 102. As depicted, the canted safari windows 106 are top side view windows positioned on an upper corner of the vehicle to provide a window opening for the passenger compartment.

Figure 2A:
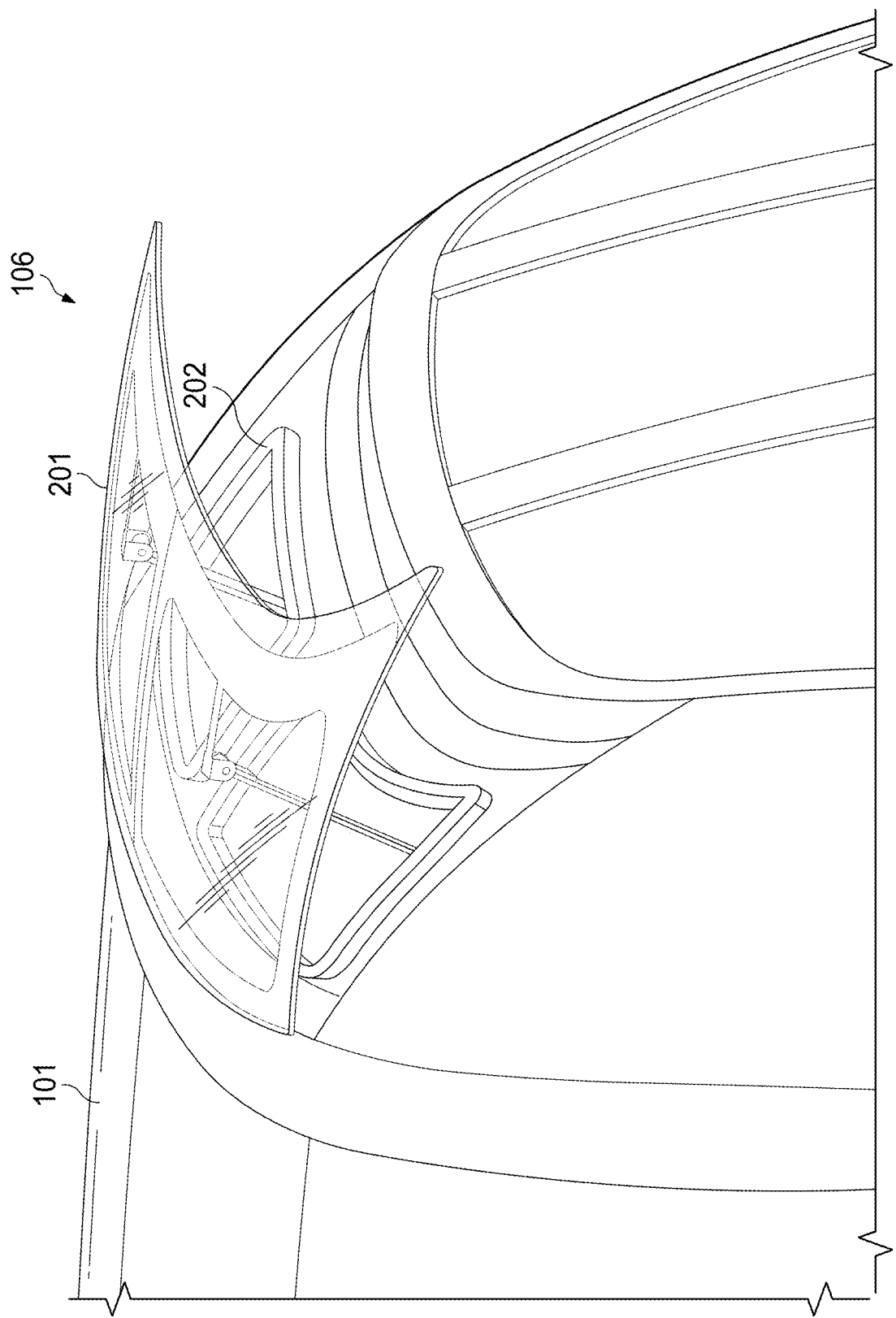
FIGS. 2A and 2B are enlarged perspective views of a pair of canted safari windows in open and closed positions, respectively, in accordance with embodiments of the present disclosure.
Figure 2B:
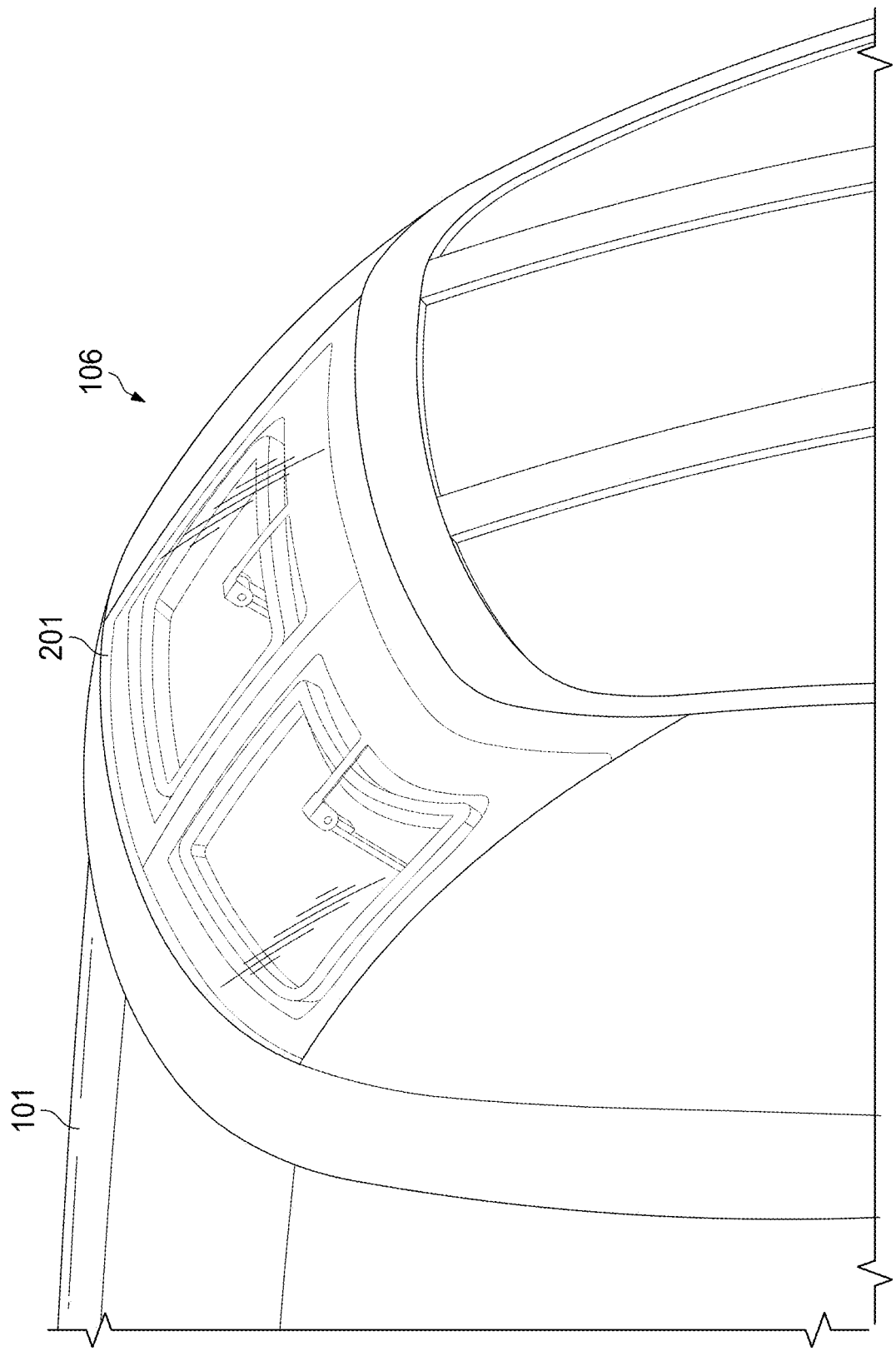

FIGS. 2A and 2B are enlarged perspective views of a pair of canted safari windows in open and closed positions, respectively, in accordance with embodiments of the present disclosure. The embodiment shown in FIGS. 2A and 2B is for illustration and explanation only. FIGS. 2A and 2B do not limit the scope of this disclosure to any particular implementation, or exclude variants.

The canted safari windows 106 may be configured to rotate upwards and out away from the vehicle body 101 in gull-wing fashion, between open (FIG. 2A) and closed (FIG. 2B) positions with respect to the vehicle interior. As can be appreciated the method for opening and closing the top view side window can take on any number of different forms and utilize a number of different mechanisms and configurations that can allow for the opening and closing of the window. The canted safari windows 106 may be configured in one or more assemblies that can be installed on any number of vehicle configurations.

Each canted safari window 106 includes a windowpane 201 that extends, in the closed position, across opening(s) in the vehicle cabin 101 between the exterior to the interior. In the closed position, surface regions of the windowpane 201 contact seal(s) 202 around edges of the opening(s). Each canted safari window 106 is mounted to the vehicle cabin on hinges and is opened or secured by a latch, as described in further detail below.

A close-out panel can be added to create a seal path and manage water or prevent unwanted water from entering the cabin. The upper portion of the cant rail for the upper roof panel of the vehicle may be angled downward such that enough room is present to keep hinges hidden. The angle of the cant rail can allow for the close-out panel to create a channel around the seal 202 and direct most of the water away from the seal 202. Channels formed near the pillar(s) aid in directing water away from the vehicle doors as well as the canted safari windows 106.

The canted safari window assembly may be configured with a window seal element. The window seal 202 may be compressible such that a tight seal is formed when the respective canted safari window is closed. The window seal 202 may have 2.5 millimeter (mm) of compression. The seal 202 may have additional flange elements that help extend the surface area of the seal and can cover any unexpected deflection in the glass as well as compensate for any variations in the glass and other assembly components, to further prevent unwanted water intrusion.

Figure 3:
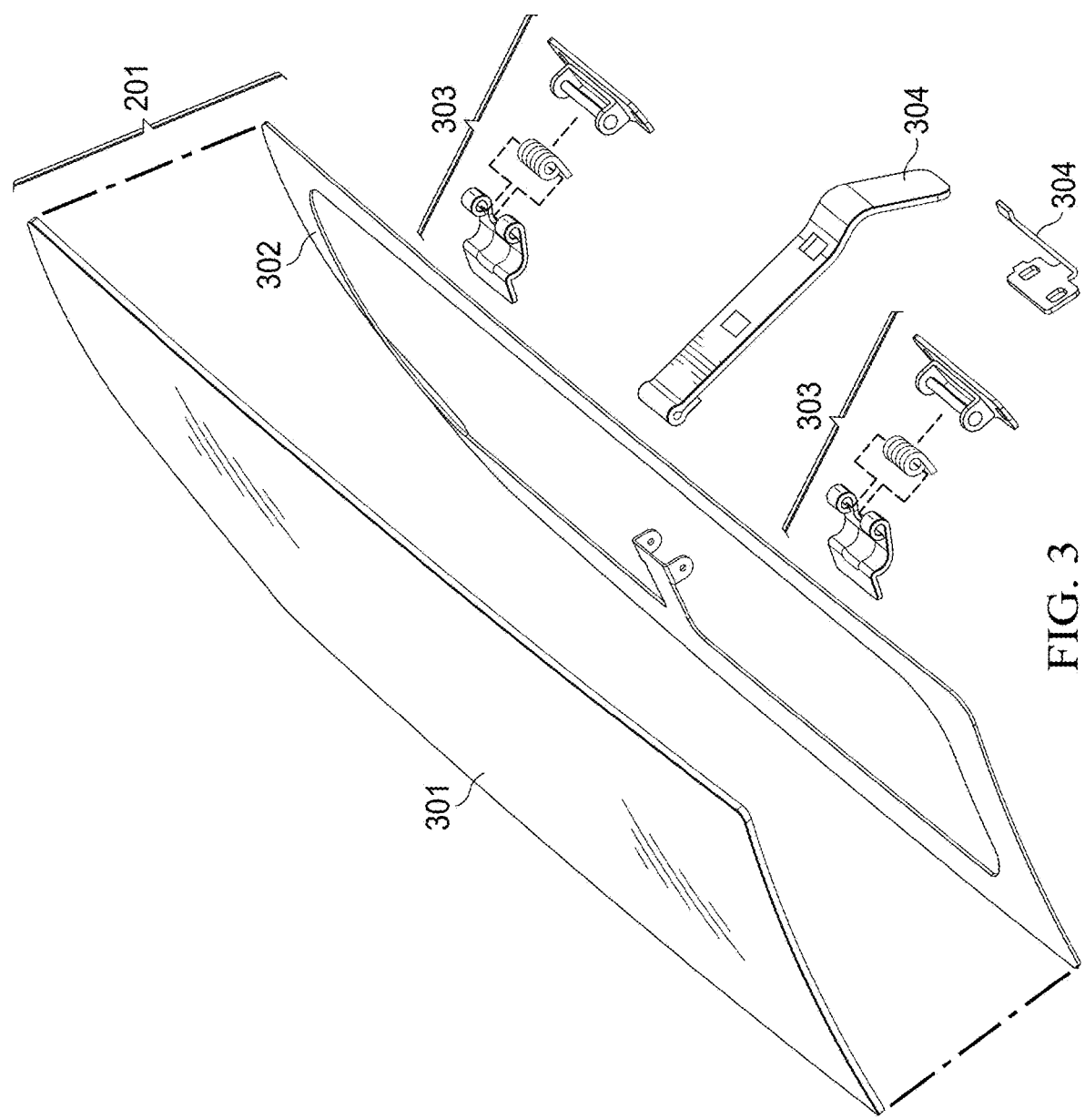
FIG. 3 is an exploded view of a windowpane and associated hinges and latch for a single canted safari window of the type depicted in FIGS. 1A through 2B.

FIG. 3 is an exploded view of a windowpane and associated hinges and latch for a single canted safari window of the type depicted in FIGS. 1A through 2B. The embodiment shown in FIG. 3 is for illustration and explanation only. FIG. 3 does not limit the scope of this disclosure to any particular implementation, or exclude variants.

Windowpane 201 includes a "glass" portion 301 (which may be a transparent material other than glass) supported on a window frame 302, secured thereto by any means of adhesion so that the windowpane 201 moves or rotates as a single element as the window is opened or closed. The window frame 302 can be connected to one or more hinge assemblies 303 that are secured to a portion of the vehicle body. The hinges 303 may be spring operated to provide enough force to move the windowpane 201 if a latch 304 is released.

Figure 4A:
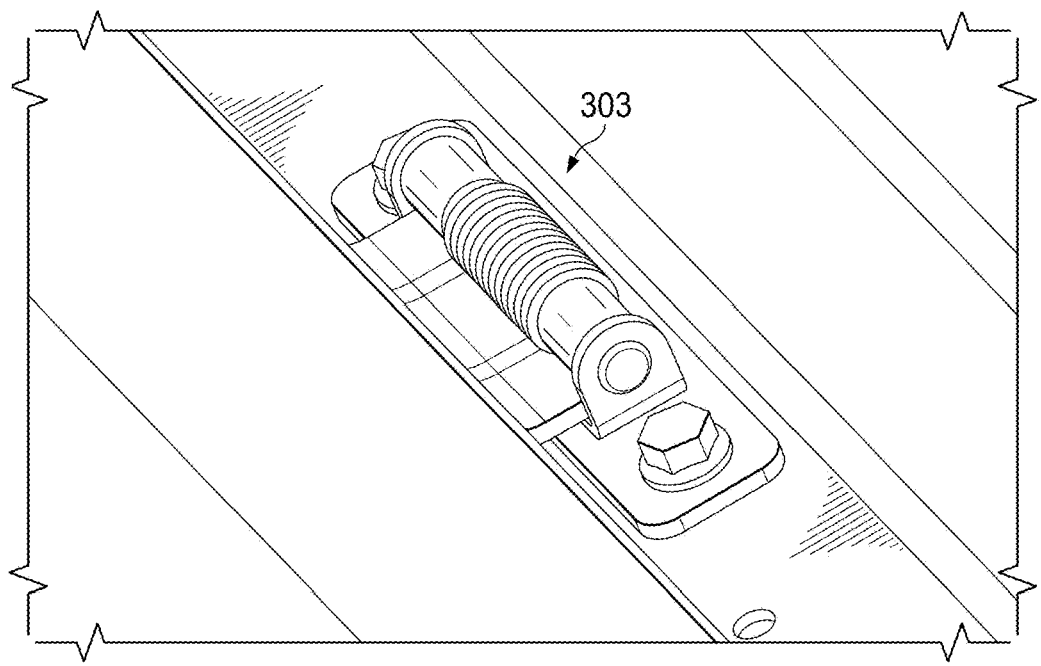
FIG. 4A is an assembled view.
Figure 4B:
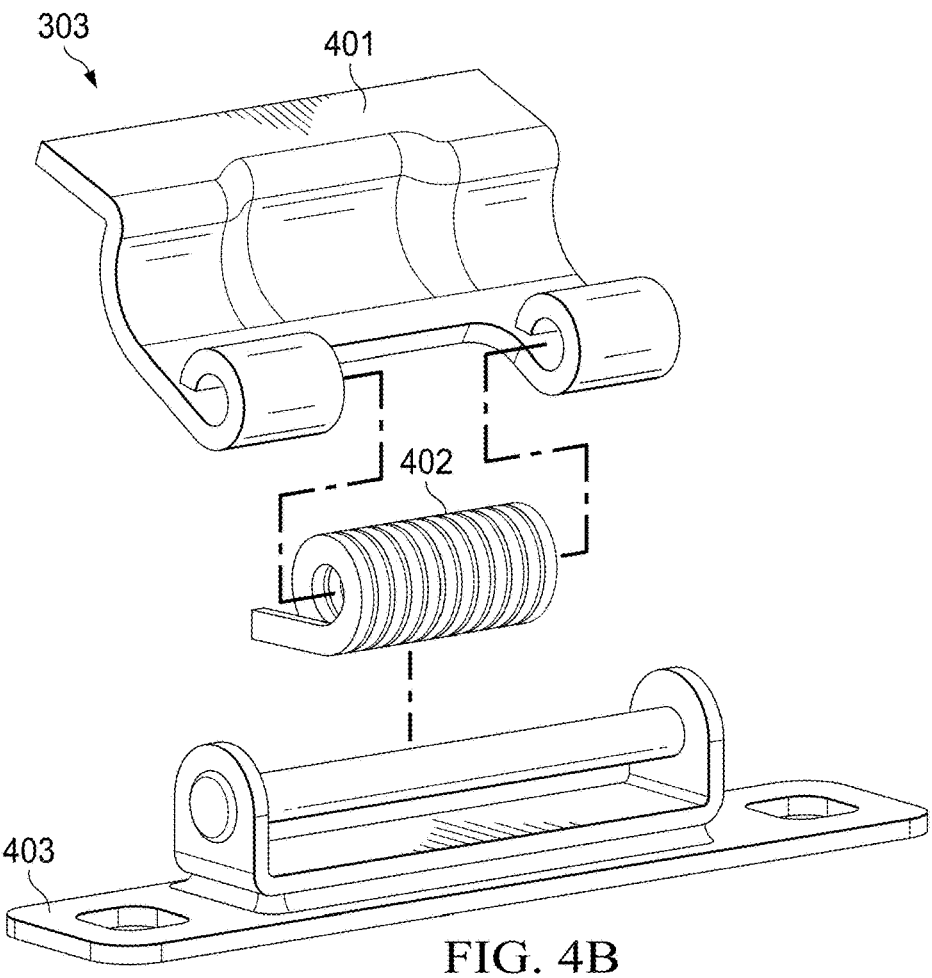
FIG. 4B is an exploded view, of a hinge assembly for a canted safari window of the type depicted in FIGS. 1A through 2B.

FIG. 4A is an assembled view, and FIG. 4B is an exploded view, of a hinge assembly for a canted safari window of the type depicted in FIGS. 1A through 2B. The embodiment shown in FIGS. 4A and 4B is for illustration and explanation only. FIGS. 4A and 4B do not limit the scope of this disclosure to any particular implementation, or exclude variants.

Hinge assembly 303 can aid in the opening and closing of the window. The hinge assembly 303 includes a glass strap 401 that connects to the windowpane 201, a spring 402 or other resilient device that biases rotation of the glass strap 401 relative to a base 403. In the example show, the base 403 is formed from a plate with through-holes for bolts, a clevis spot-welded to the plate, and a pin extending between the holes of the clevis. portion that connects with the glass portion of the window 404. The spring 402 within the example hinge assembly 303 is a torsion spring, but other forms of resilient devices that can provide the force necessary to open the window as well as hold the window open while the vehicle is moving may be substituted. As can be appreciated, the various components of the hinge assembly 303 can be manufactured in any number of ways and out of any number of different materials. For example, some hinge assembly components may be stamped, forged, and/or machined. Additionally, some components may be made of metal, plastic, and/or composite.

Figure 5:
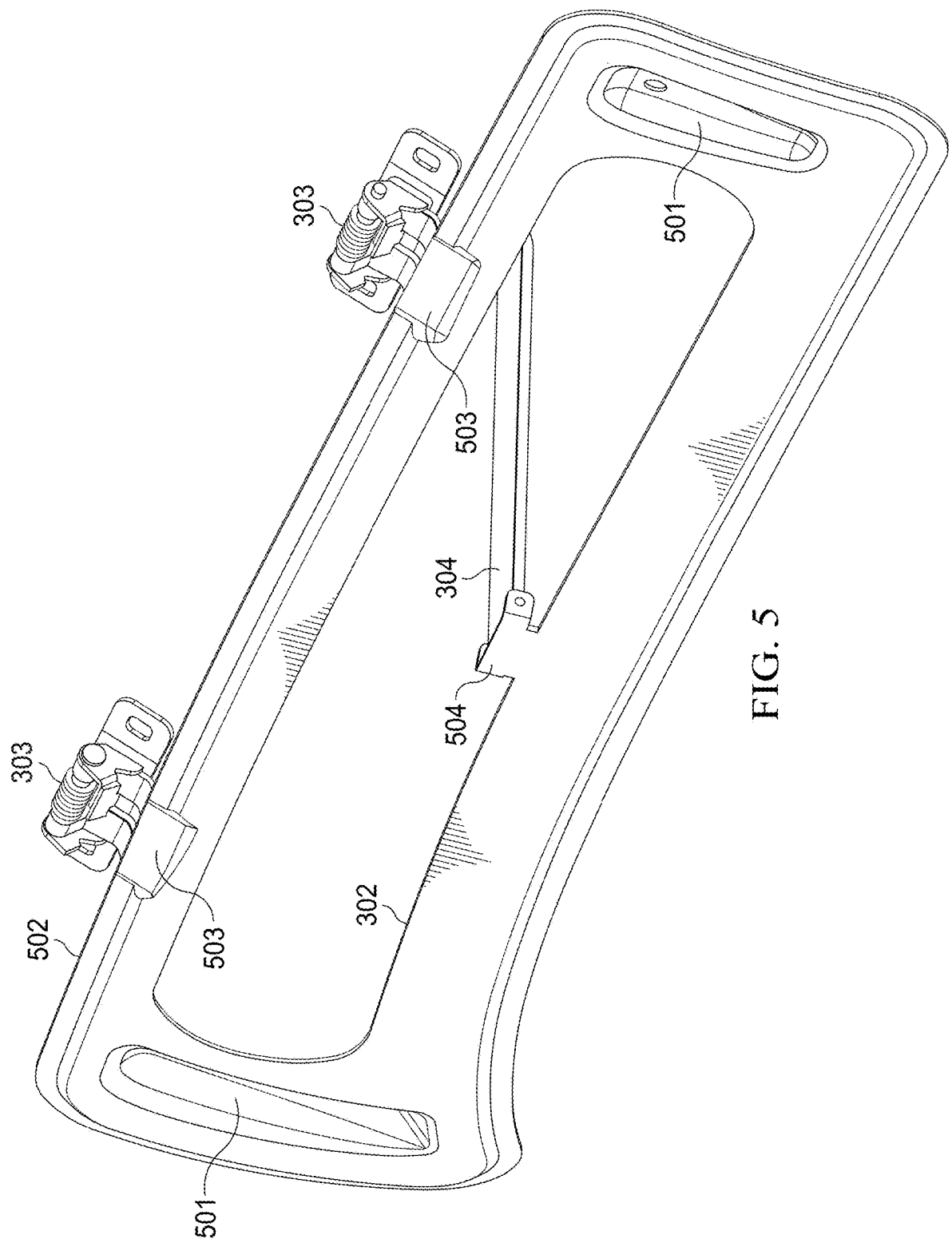
FIGS. 5 and 6 are additional views of the components for the windowpane depicted in FIG. 3.
Figure 6:
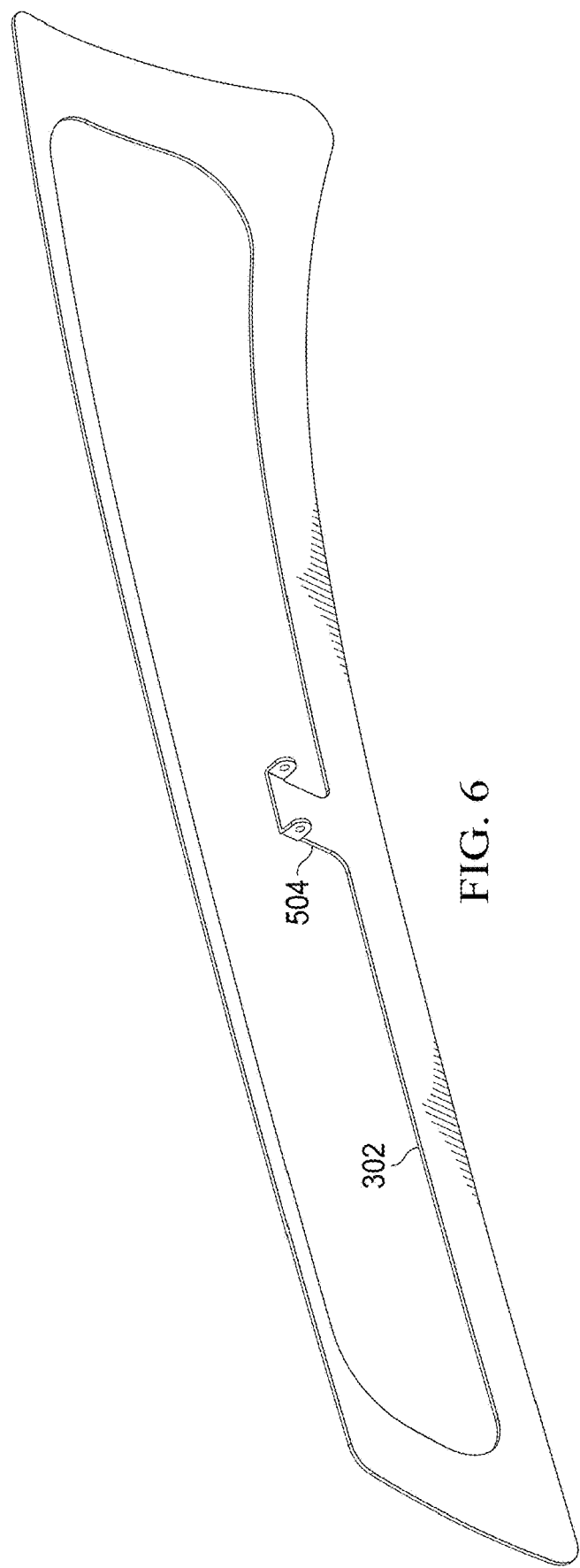

FIGS. 5 and 6 are additional views of the components for the windowpane depicted in FIG. 3. FIG. 5 depicts the frame 302 (without the glass), the hinges 303, and the latch 304. As shown, the frame 302 is formed with gripping recesses 501 for the user to employ in closing the canted safari window, a peripheral lip 502 to facilitate sealing of the opening when the canted safari window is closed, recesses 503 receiving a portion of the body of the hinges 303 when the canted safari window is closed, and a latch attachment 504. FIG. 6 depicts only the frame 302 (only) from the opposite side of the view shown in FIG. 5, to more clearly illustrate the clevis portion of the latch attachment 504. The frame 302 can have numerous attachment points 503 that correspond to hinges 303. Additionally, the frame may have latch attachment 504 that is designed to connect to the latch 304. The latch 304 can be employed by a user to open and close the window. As can be appreciated, the canted safari window assembly can have a number of different parts that ultimately play into how the window can function. Additionally, many embodiments may include one or more different methods of assembling the various components such as welding, adhesive bonding, or some type of mechanical bonding. The structure preferably allows for a window to remain in an open position during the movement of a vehicle and is able to withstand the forces that naturally comes from the movement of the vehicle, without significant disruption of the aerodynamics.

Figure 7:
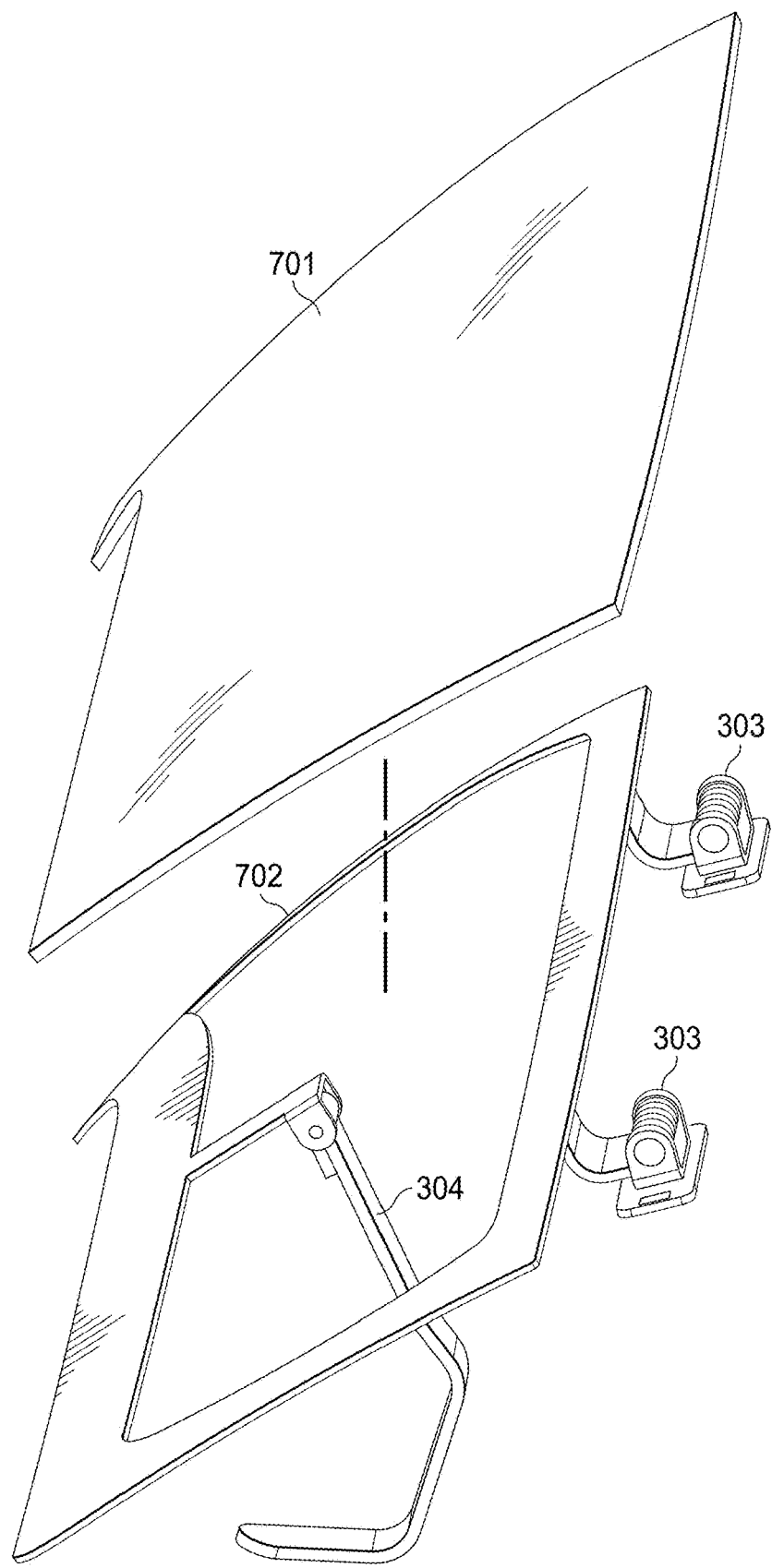
FIG. 7 is a partially exploded view of an alternate embodiment for a windowpane and associated hinges and latch for a single canted safari window of the type depicted in FIGS. 1A through 2B.

FIG. 7 is a partially exploded view of an alternate embodiment for a windowpane and associated hinges and latch for a single canted safari window of the type depicted in FIGS. 1A through 2B. The alternate embodiment shown in FIG. 7 is for illustration and explanation only. FIG. 7 does not limit the scope of this disclosure to any particular implementation, or exclude variants.

In the alternate embodiment of FIG. 7, the windowpane includes a "glass" portion 701 supported on and secured to a frame 702. The frame 702 is connected to one or more spring-operated hinge assemblies 303 that are secured to a portion of the vehicle body, with a latch 304 selectively securing the window in the closed position and employed by the user to open the window. As evident from FIG. 7, the alternate embodiment has more pronounced curvature to the glass 701 and corresponding frame 702. The different appearance of the latch 304 results from flexibility of an end of the strap for the latch 304—that is, the canted safari windows can be configured to open and close in a number of different ways, and can be configured to be secured in different ways, as described in further detail below.

Figure 8:
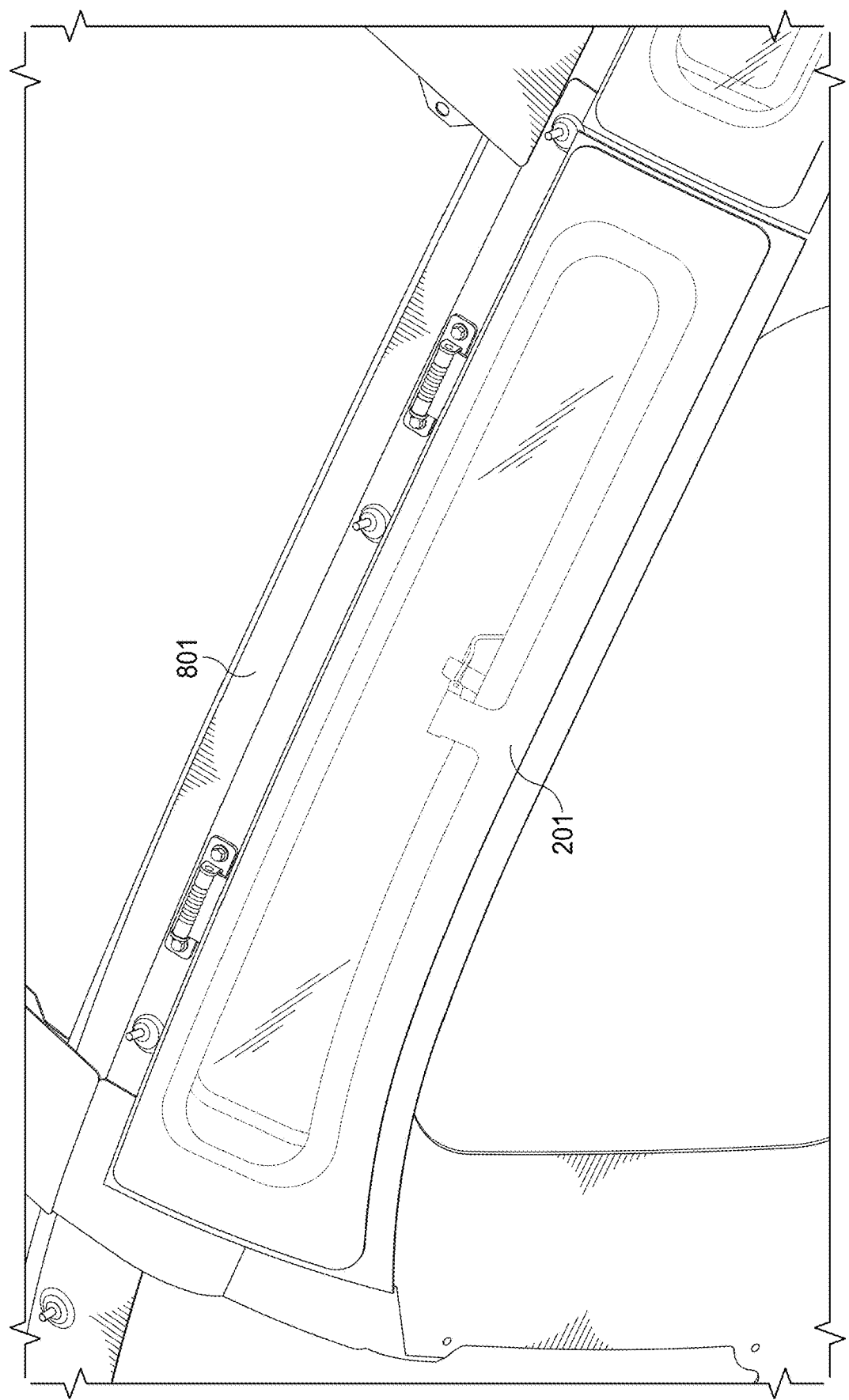
FIG. 8 is an interior view of a single canted safari window of the type depicted in FIGS. 1A through 2B, mounted inside a vehicle.

FIG. 8 is an interior view of a single canted safari window of the type depicted in FIGS. 1A through 2B, mounted inside a vehicle. When positioned within or attached to an internal frame 801 of a vehicle, the window offers an additional view port to occupants of the vehicle.

Figure 9:
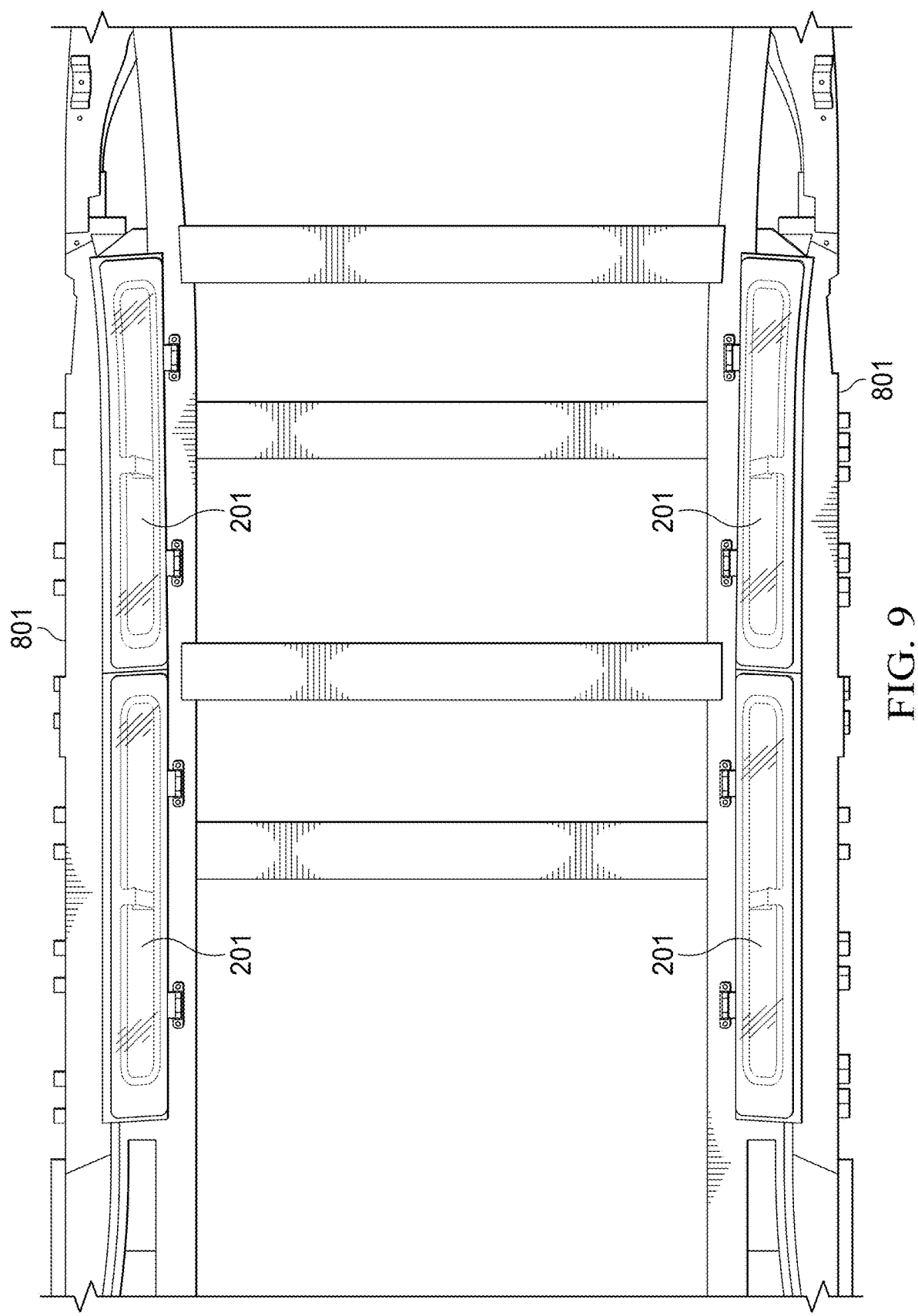
FIG. 9 is an interior view of multiple canted safari window of the type depicted in FIGS. 1A through 2B, mounted inside a vehicle.

FIG. 9 is an interior view of multiple canted safari window of the type depicted in FIGS. 1A through 2B, mounted inside a vehicle. The canted safari windows can be positioned in series—in other words, aligned within the frame along a length of the vehicle, positioned over different rows of seats on both sides.

Figure 10:
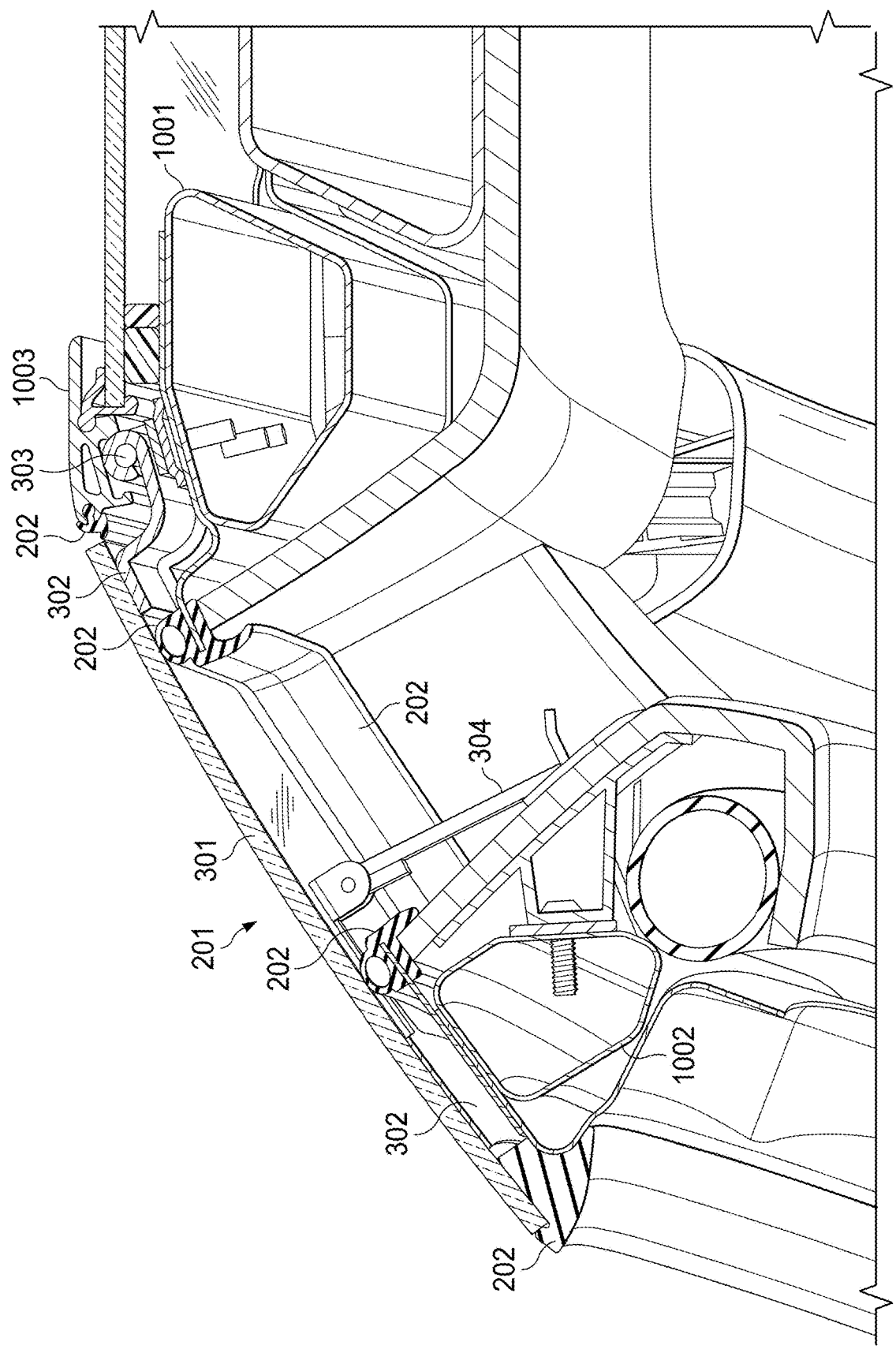
FIG. 10 is a sectional view of a single canted safari window of the type depicted in FIGS. 1A through 2B, mounted inside a vehicle.

FIG. 10 is a sectional view of a single canted safari window of the type depicted in FIGS. 1A through 2B, mounted inside a vehicle. The canted safari window 201 is installed between upper and lower rails 1001 and 1002, respectively, on the vehicle frame. The seals 202, which can be made of any suitable material that can form a seal between the window 201 and the vehicle frame, are shown in partial compression with the fully expanded profile shown in phantom. The seals 202 help seal the interior of the vehicle from the outer environment when the canted safari window 201 is closed. The frame 302 provides window reinforcement, positioned above or exterior to the lower rail 1002 and configured to support the window glass 301 or provide reinforced elements for the window 201. The hinges 303 are mounted to the upper rail 1001, which provides a hard mount for the hinges 303. The latch 304 is mounted to the lower rail 1002, which provides a hard mount for the latch 304, through interior vehicle trim. A molding or covering 1003 that covers the hinges 303 or attachment mechanisms for the window 201 can also maintain 2.5 mm of material around the hinges based on the profile of the molding 1003. The installation of the canted safari window 201, and the types of attachment mechanisms used, can vary depending on the particular placement and structure of the window 201, the configuration of the vehicle frame structure, and the different safety devices (as well as a number of additional factors). Therefore, embodiments may have a different configuration to meet safety and structural requirements of a vehicle. For example, while not specifically shown in FIG. 10, the mounting of the window 201 to the upper and lower rails 1001, 1002 may include airbags than can be used for safety measures in the event of an impact to the canted safari window 201.

Figure 11A:
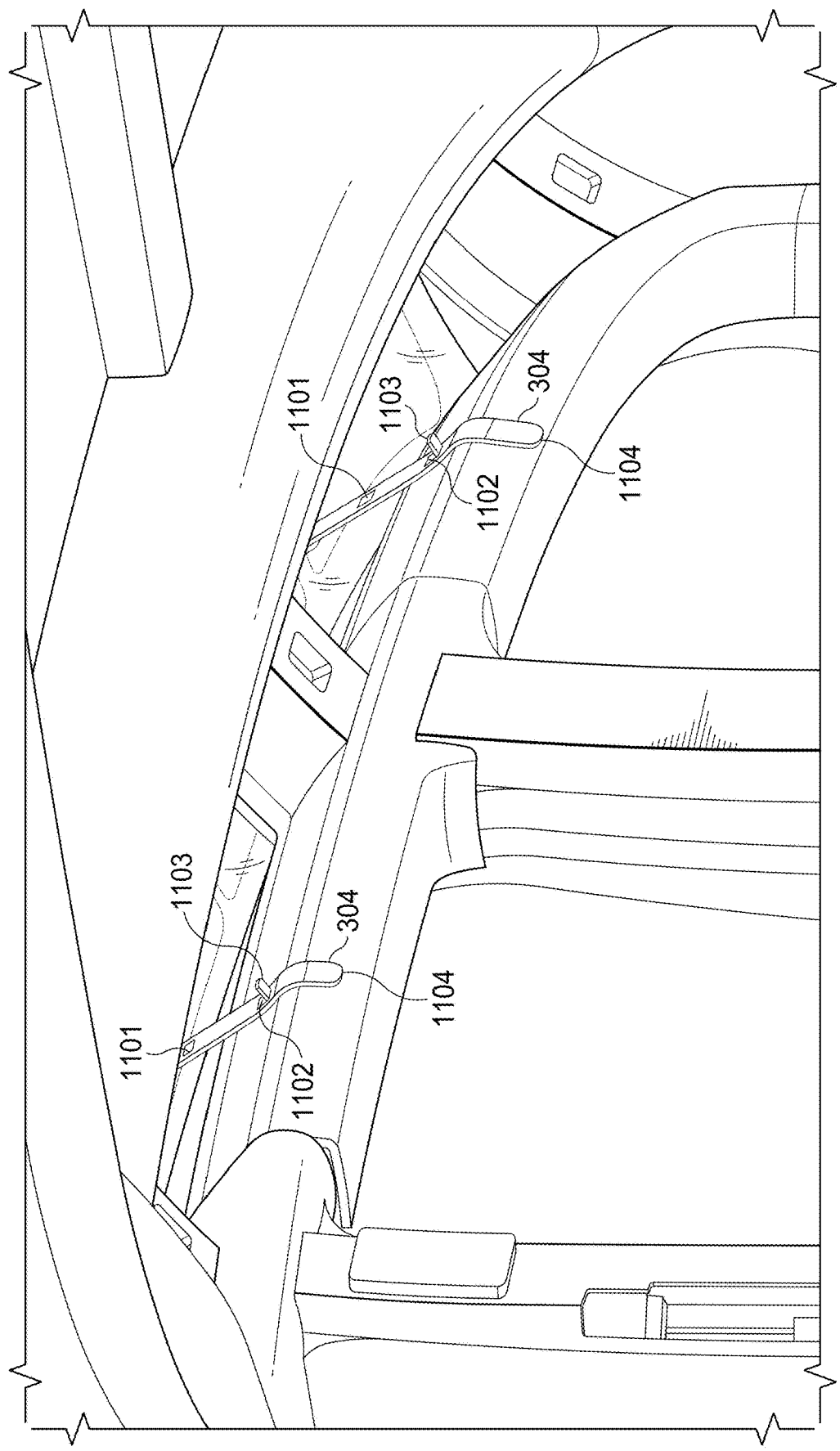
FIGS. 11A though 11C are various views from the vehicle interior illustrating operation of the latch for canted safari windows of the type depicted in FIGS. 1A through 2B.
Figure 11B:
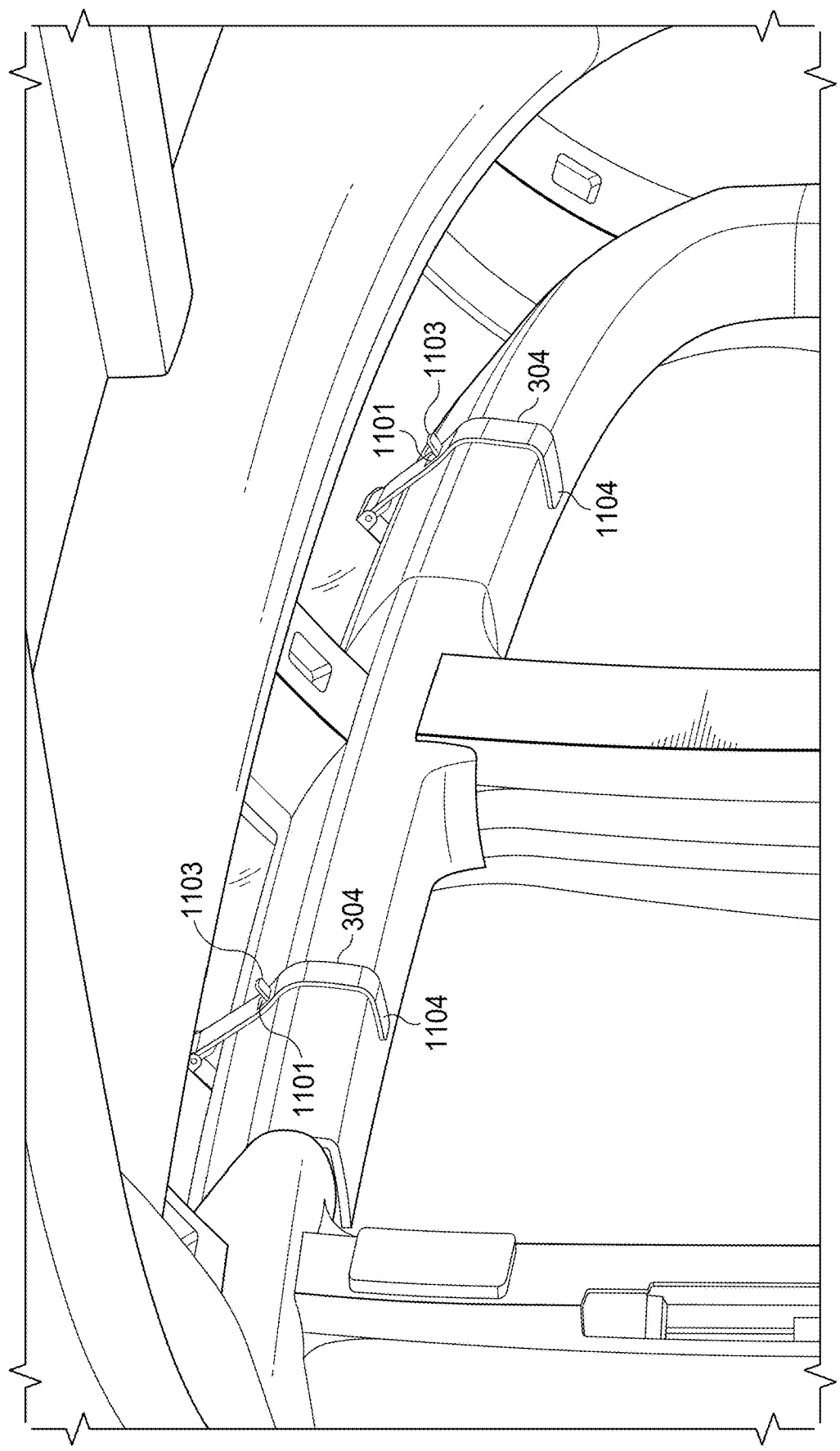
Figure 11C:
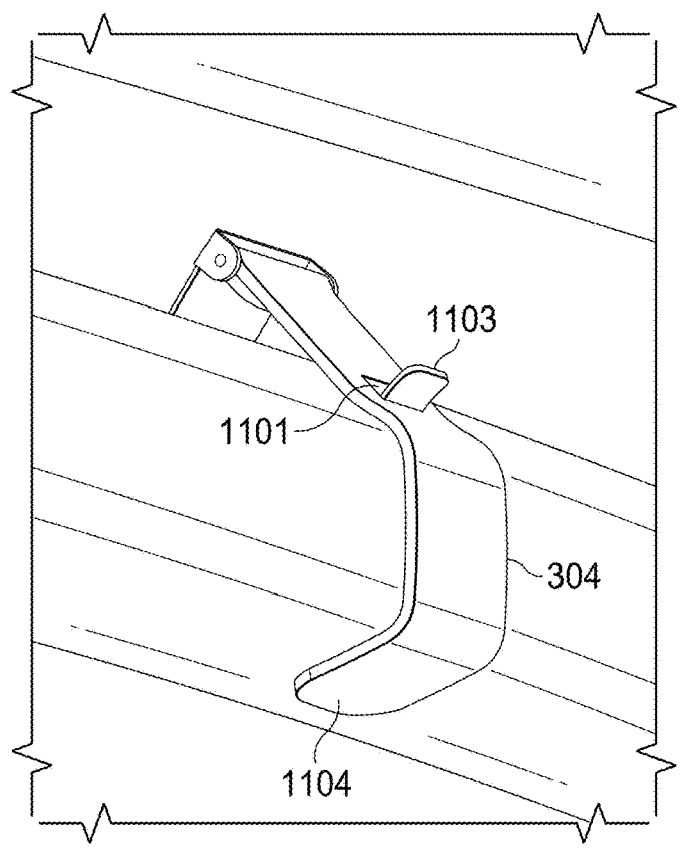

FIGS. 11A though 11C are various views from the vehicle interior illustrating operation of the latch for canted safari windows of the type depicted in FIGS. 1A through 2B. Latch 304 helps secure the window in an open position, shown in FIG. 11A, and/or a closed position, shown in FIG. 11B. FIG. 11C is an enlarged view of a portion of FIG. 11B. Latch 304 is in the form of a strap having connection points 1101, 1102 to bind or connect the latch 304 to a portion of the vehicle. In the example of FIGS. 11A through 11C, the connection points 1101, 1102 for latch 304 are openings in the strap for the latch 304 (for simplicity, one opening 1102 in each strap is not shown in each of FIGS. 11B and 11C). The connection points 1101, 1102 receive a hook-like protrusion 1103 mounted, through interior vehicle trim, to the lower rail as depicted in FIG. 10. In the window open position illustrated in FIG. 11A, the protrusion 1103 is received by the connection point 1102 closest to an end 1104 of the strap for the latch 304. In the window closed position illustrated in FIGS. 11B and 11C, the protrusion 1103 is received by the connection point 1101 furthest 1104 from the end of the strap for the latch 304. As can be appreciated, a single latch requires a certain amount of stiffness in order to hold the window in position. The latch 304 has one section, between the connection point 1102 closest to the end of the strap for the latch 304 and the attachment of the strap to the window frame, that is stiff. The remaining section of the strap, beyond the connection point 1102 and extending to the end 1104 of the strap, may be flexible such that the strap end can mold around the contour of a vehicle frame or trim. The flexibility of the strap end allows the strap to be securely stored, out of the way, in any position. A magnetic tip at the end 1104 of the strap for the latch 304 allows the end 1104 to magnetically connect to the (metallic) lower rail of the vehicle frame through the interior trim.

Figure 12:
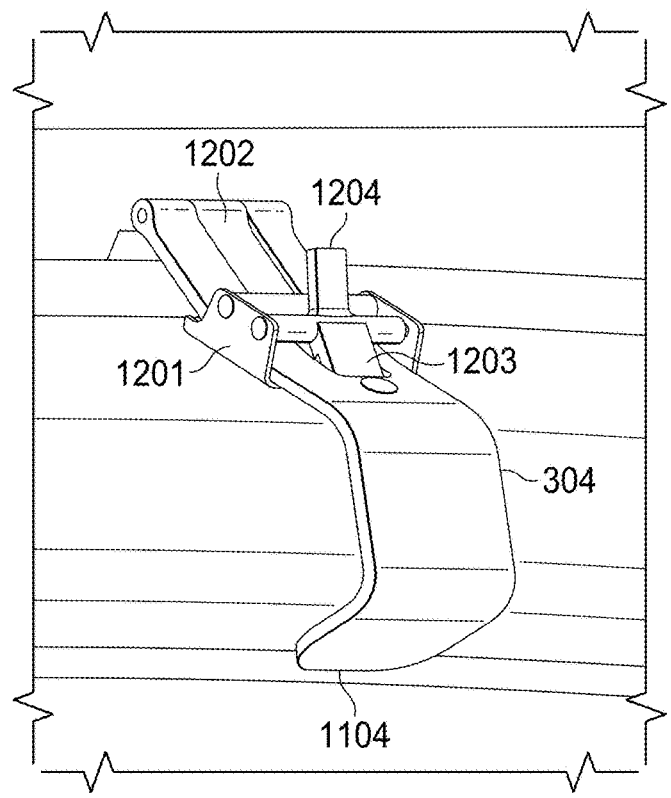
FIG. 12 is a view from the vehicle interior, similar to FIG. 11C, illustrating operation of an alternative design for the latch for canted safari windows of the type depicted in FIGS. 1A through 2B.

FIG. 12 is a view from the vehicle interior, similar to FIG. 11C, illustrating operation of an alternative design for the latch for canted safari windows of the type depicted in FIGS. 1A through 2B. The latch 304 can have multiple components that cooperatively engage with each other to allow for securing the window in the different window positions. The embodiment of FIG. 12 includes a ratcheting lock and release mechanism 1201 that can engage with at least a portion 1202 of the strap. The strap includes a section 1202 that cooperatively engages with an opposite end 1203 of a rotatable locking/release lever 1204 mounted on the ratcheting lock and release mechanism 1201. Additionally, as depicted in FIG. 12, the portion 1202 of the strap may be positioned within a channel within the strap, where the channel guides the opposite end 1203 of the rotatable locking/release lever 1204 to keep that end properly aligned in place. In this embodiment, the portion 1202 of the strap and the opposite end 1203 of the rotatable locking/release lever 1204 have opposing teeth that can interlock such that, when engaged, tension on the strap holds the strap in place, and therefore holds the window in the desired position between open and closed.

Figure 13:
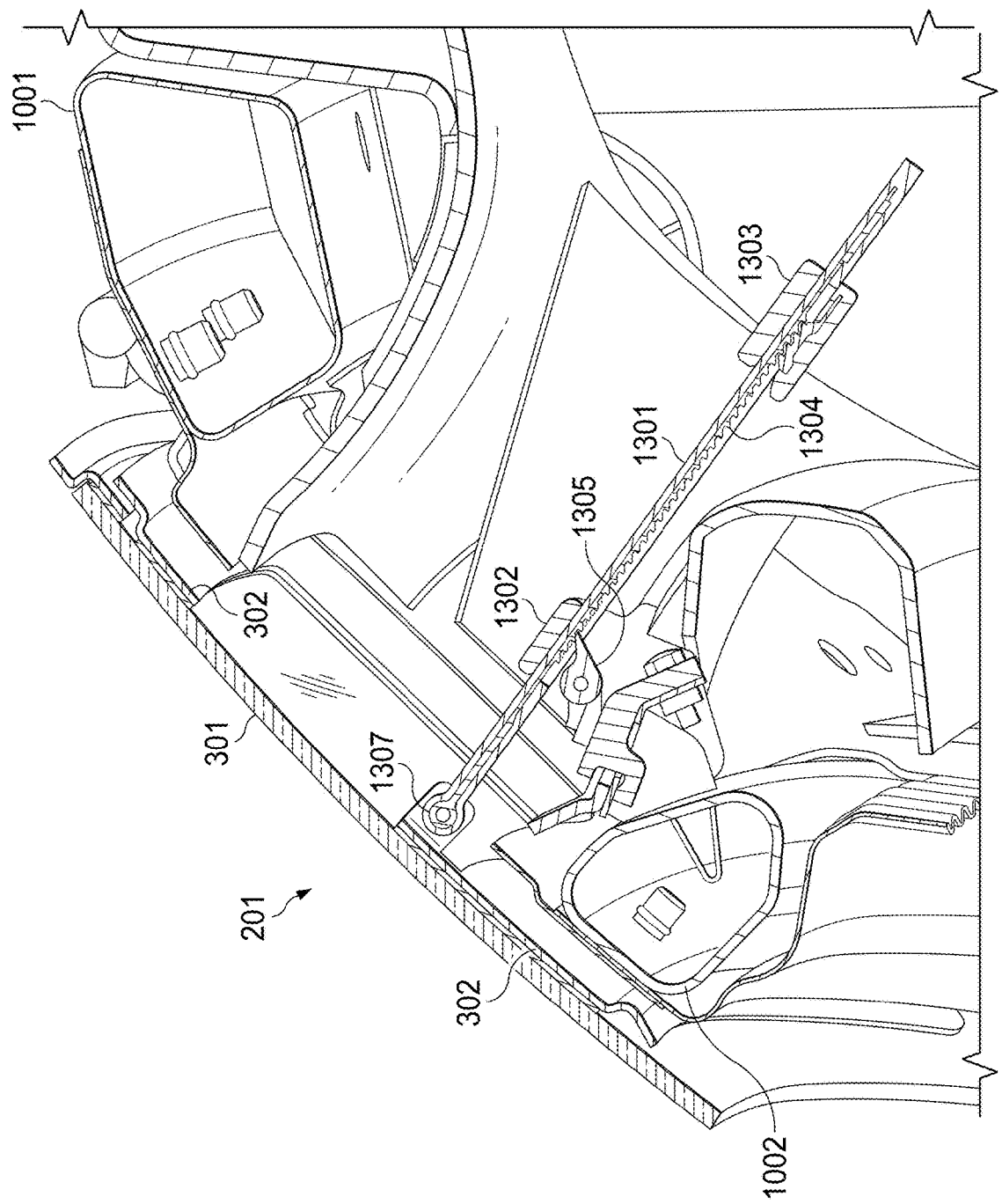
FIG. 13 is a sectional view of components for an alternative latch design for a single canted safari window of the type depicted in FIGS. 1A through 2B, mounted inside a vehicle.
Figure 13A:
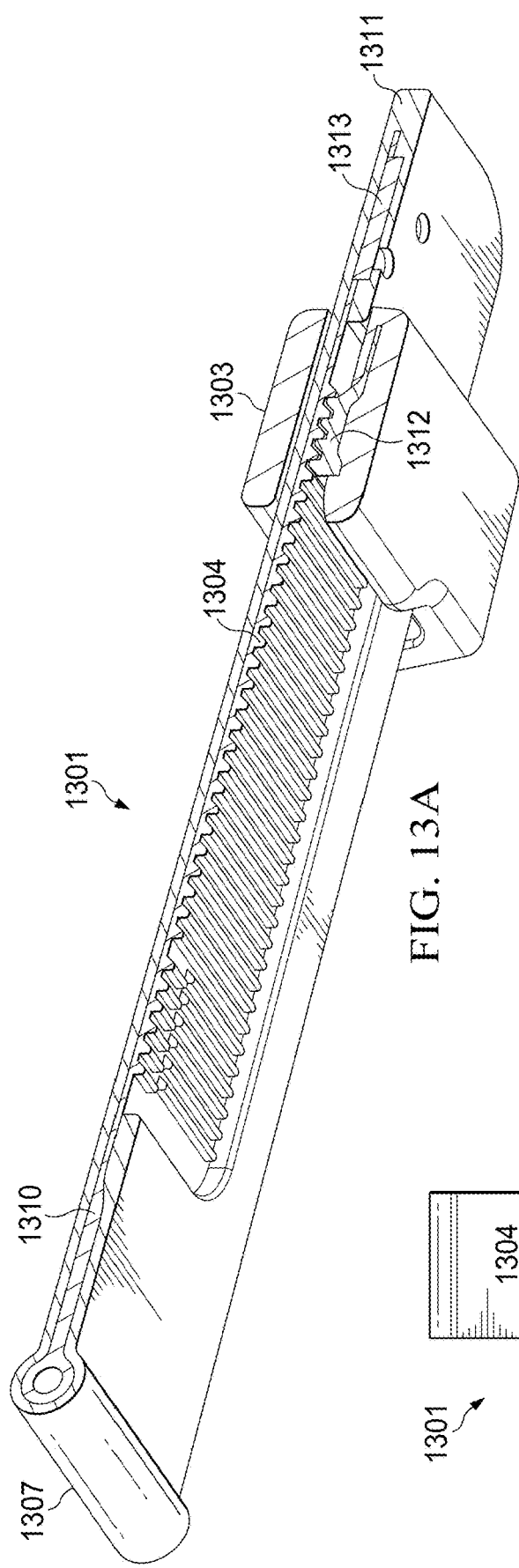
FIG. 13A is an enlarged perspective sectional view.
Figure 13B:
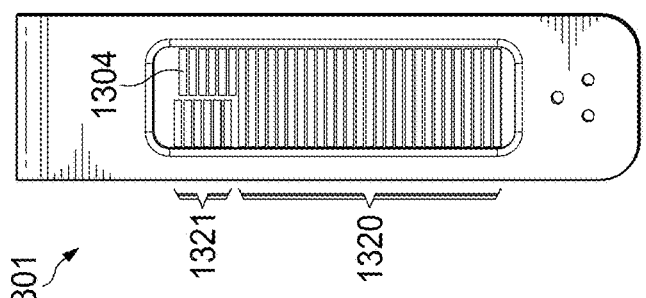
FIG. 13B is an orthogonal view, of the strap (only) in FIG. 13.
Figure 13C:
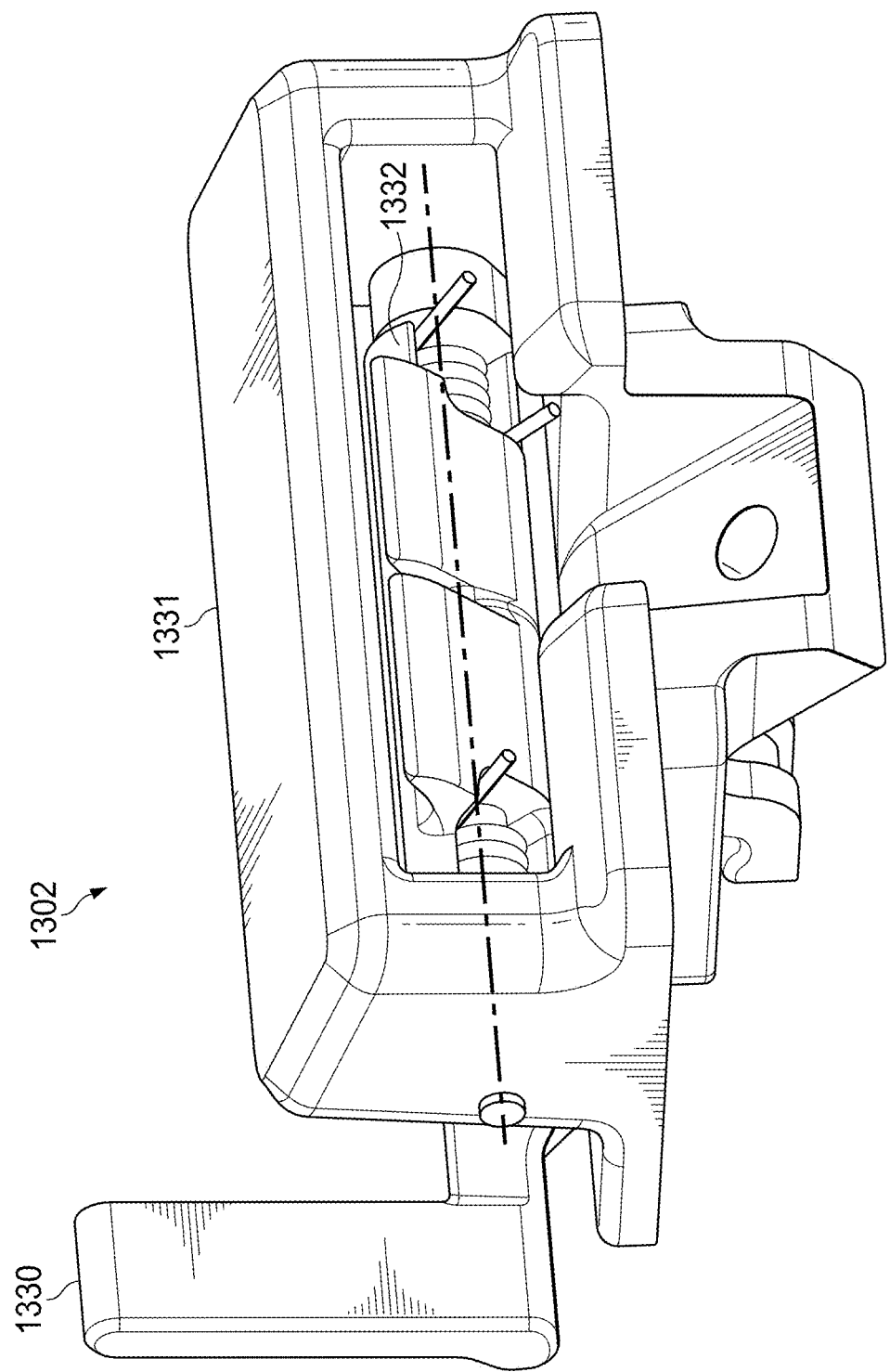
FIG. 13C is a perspective view of the rachet (only) in FIG. 13.

FIG. 13 is a sectional view of components for an alternative latch design for a single canted safari window of the type depicted in FIGS. 1A through 2B, mounted inside a vehicle. FIG. 13A is an enlarged perspective sectional view, and FIG. 13B is an orthogonal view, of the strap (only) in FIG. 13. FIG. 13C is a perspective view of the rachet (only) in FIG. 13. The latch in FIG. 13 includes a strap 1301, a rachet 1302, and an optional secondary engagement device 1303. The strap 1301 for the latch includes engagement teeth 1304 that can engage with a projecting tip on an opposing cam 1305, to hold the open and/or closed position of the window 201. The cam 1305 is secured within rachet 1302 that is movable but that allows for movement of the strap 1301 to be controlled so that the teeth 1304 can regularly engage with the projecting tip of the cam 1305. One end 1307 of the strap 1301 is pivotably secured to the window frame 302. Disengaging the projecting tip of the cam 1305 from the teeth 1304 allows the strap to be moved longitudinally. The strap 1301 may also be held in place by a secondary engagement device 1303 positioned away from the end 1307, with rachet 1302 therebetween. The secondary engagement device 1303 can have teeth similar to those on the strap 1301 to engage with the teeth 1304 on the strap 1301 and be moved along a length of the strap 1301 to help keep the strap from moving around once locked into position. This alternative latch design allows the window to be opened or closed to a larger number of positions than the embodiment previously described.

As shown in FIG. 13A, strap 1301 has a number of features that ultimately help the latch function as intended. The strap 1301 may have an integrated support element 1310 formed of a rigid material that provides stiffness and strength to the strap 1301, with the support element encased in an encasement 1311 formed of a softer material that provides a desired tactile engagement for the occupant. The support 1310 may be an over molded piece of plastic that may have the opposing teeth disposed in an engagement area and preformed into the body thereof. The support 1310 may have the teeth 1304 exposed by an opening in the encasement 1311. The teeth 1304 can be configured to cooperatively engage with corresponding teeth 1312 within the secondary engagement device 1303 to lock in or engage with the secondary engagement device 1303. As shown in FIG. 13B, the strap 1301 may have a section with engagement teeth 1304 in which the teeth occur at different intervals to allow for a more refined adjustment of the window such as one area 1320 in which the steps between the teeth 1304 can be 2.5 mm while another area 1321 has teeth at steps of 1.25 mm.

The end of the strap 1301 opposite the pivot end 1307 can have a magnetic device 1313 therein serving as an additional element to help secure the strap 1301. In operation, the strap 1307 is attached at the pivot end 1307 to the window frame such that the longitudinal movement of the strap through the rachet causes movement of the window 201. The magnet 1313 or other attachment means enables the free end of the strap 1301 to be secured and out of the way of the user. As shown, the teeth 1304 may be formed in two staggered rows such that each row can engage with a different portion of the latch. The staggered rows may be present on along different portions of the strap or be used throughout the entire engagement area.

As shown in FIG. 13C, the locking device or rachet 1302 includes a release lever 1330 and at least two different locking cams 1305*a* and 1305*b* positioned within a housing 1331 for the rachet 1302. The locking cams 1305*a* and 1305*b* can be configured to correspond to different stepped spacing between teeth on a strap such that each one can engage at different locations and still allow for a refined adjustment. The lever 1330 can be used to release the tension on the cams (1305*a* and 1305*b*) and allow a strap to move freely in a longitudinal direction within the rachet 1302. Additionally, the lever 1330 can be spring or resilient member (torsion spring 1332 in the example depicted) actuated to allow for the cams to reengage the strap once released. The housing 1331 can be fixed to a portion of the vehicle body to provide a rigid support for the latch. Torsion spring 1332 can be used to actuate and hold tension on the cams while engaged with teeth on a strap.

The strap may be attached via down-turned dog ears and a pin bonded directly to glass, and the hinges may similarly be bonded directly to the glass, without a window frame. Additionally, regulations (Economic Commission for Europe (ECE) Regulation 26-03 (R26)) require for the leading edge of glass that is forward facing to have a radius of 2.5 mm or more or have a shore hardness of 60 A or lower for occupant safety. In order to comply, thicker glass may be employed to obtain a 2.5 mm radius on the glass edge (e.g., 5+ mm thick) or the glass may be encapsulated to obtain the proper radius or hardness. Glass encapsulation will save weight while still maintaining compliance with the requirements of the regulation. Additional seal(s) may be used in conjunction with the encapsulation to account for any gap at the top of the vehicle.

The canted safari window(s) described above take advantage of the increased space and functionality of electric vehicles while providing for ease of operation, reduced cost and reduced weight, but while also maintaining compliance with both engineering safety requirements and aerodynamic performance and remaining aesthetically appealing. A window assembly that has a support element attached to the frame of a vehicle and the support element is configured to support a glass element such that the window can be opened and closed with a latching mechanism. The latching mechanism preferably has two main components, one being a latch housing and the other being a latch strap. The latch strap can be adjusted through the housing and secured to the interior surfaces of the vehicle. These features contrast with traditional window latches, the operation of which could be difficult and awkward within the context of a canted safari (top side view) window. The use of traditional latches can reduce the number potential occupants that can operate the window when careful consideration with respect to the vehicle and occupant is not considered. Additionally, in order to maintain occupant comfort and safety, the position of any support rails and elements for the window must be considered such that the overall safety and comfort of the occupants is not sacrificed for the use of a window. Finally, windows that open and close near the side and/or top of a vehicle must be capable of withstanding the pressures and forces generated from a moving vehicle, such that the window and vehicle are not damaged. Furthermore, the window must be capable of maintaining a seal such that wind and water cannot enter the passenger compartment accidentally.

In some traditional window elements that open and close via a hinge, a number of mechanisms can be used. For example, many traditional manufactures will use electric motors to drive a push rod connected to the window thus forcing the window open. Others may use gas or hydraulic struts to provide a pushing force on the window such that when the window attachment point is released the window automatically opens. However, many of the traditional design features would not be desirable in the context of some vehicles such as when an aspect like which weight savings is important to the operating range of the vehicle.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A cabin assembly, comprising:
    a cabin having a cabin roof and cabin sides, the cabin roof extending for a portion of a length between a front and a rear of a vehicle;
    cabin sides extending for a portion of the length between the front and the rear of the vehicle;
    one or more windows canted between the cabin roof and the cabin sides along a portion of the length between the front and the rear of the vehicle, the one or more windows each configured to open outwardly from an interior of the vehicle and to be secured in an open position and in a closed position; and
    for each of the one or more windows:
        two spaced apart hinges attaching the respective window to a portion of the cabin in a manner allowing rotation of the respective window, each of the two spaced apart hinges secured to a rail of a vehicle body including the cabin, and
        a latch securing the respective window in the open position or the closed position, wherein the latch is secured at one end to the respective window and at an opposite end to a rail of the vehicle body, and wherein the respective window is movable between the open position and the closed position by an occupant.

2. The cabin of claim 1, wherein the one or more windows comprise two windows on each side of the vehicle, each window aligned with a passenger door in one of the cabin sides.

3. The cabin of claim 1, wherein at least one of the one or more windows comprises:
    a transparent material; and
    a window frame to which the transparent material is secured, the window frame having an opening therethrough.

4. The cabin of claim 1, wherein the two spaced apart hinges are each spring-biased to inhibit movement of the respective window from one of the open position or the closed position.

5. The cabin of claim 3, wherein the transparent material is glass.

6. The cabin of claim 1, wherein the latch comprises:
    a strap having an elongated body with a first end and a second end, where the first end is connected to the respective window and the second end extends opposite the first end and is positioned such that the elongated body of the strap rests within a latch housing,
    wherein the elongated body of the strap includes engagement teeth disposed along a portion of the elongated body, and
    wherein the latch housing comprises a lever resiliently connected to an opposing engagement tooth configured to cooperatively engage with the engagement teeth of the strap and to allow movement of the strap within the latch housing.

7. The cabin of claim 6, wherein the strap includes a flexible end configured to be wrapped around interior trim over a rail within the cabin.

8. The cabin of claim 7, wherein a tip of the flexible end is magnetic to secure the flexible end when wrapped around the interior trim.

9. The cabin of claim 6, wherein the strap includes a rigid segment holding the respective window in the open position.

10. The cabin of claim 9, wherein the rigid segment includes an encasement providing tactile engagement for an occupant.

11. A method, comprising:
    providing a cabin having a cabin roof and cabin sides, the cabin roof extending for a portion of a length between a front and a rear of a vehicle;
    providing cabin sides extending for a portion of the length between the front and the rear of the vehicle;
    providing one or more windows canted between the cabin roof and the cabin sides along a portion of the length between the front and the rear of the vehicle, the one or more windows each configured to open outwardly from an interior of the vehicle and to be secured in an open position and in a closed position; and
    providing, for each of the one or more windows:
        two spaced apart hinges attaching the respective window to a portion of the cabin in a manner allowing rotation of the respective window, each of the two spaced apart hinges secured to a rail of a vehicle body including the cabin, and
        a latch securing the respective window in the open position or the closed position, wherein the latch is secured at one end to the respective window and at an opposite end to a rail of the vehicle body, and wherein the respective window is movable between the open position and the closed position by an occupant.

12. The method of claim 11, wherein the one or more windows comprise two windows on each side of the vehicle, each window aligned with a passenger door in one of the cabin sides.

13. The method of claim 11, wherein at least one of the one or more windows comprises:
    a transparent material; and
    a window frame to which the transparent material is secured, the window frame having an opening therethrough.

14. The method of claim 11, further comprising
    spring-biasing each of the two spaced apart hinges to inhibit movement of the respective window from one of the open position or the closed position.

15. The method of claim 13, wherein the transparent material is glass.

16. The method of claim 11, wherein the latch comprises:
    a strap having an elongated body with a first end and a second end, where the first end is connected to the respective window and the second end extends opposite the first end and is positioned such that the elongated body of the strap rests within a latch housing,
    wherein the elongated body of the strap includes engagement teeth disposed along a portion of the elongated body, and
    wherein the latch housing comprises a lever resiliently connected to an opposing engagement tooth configured to cooperatively engage with the engagement teeth of the strap and to allow movement of the strap within the latch housing.

17. The method of claim 16, wherein the strap includes a flexible end configured to be wrapped around interior trim over a rail within the cabin.

18. The method of claim 17, wherein a tip of the flexible end is magnetic to secure the flexible end when wrapped around the interior trim.

19. The method of claim 16, wherein the strap includes a rigid segment holding the respective window in the open position.

20. The method of claim 19, wherein the rigid segment includes an encasement providing tactile engagement for an occupant.

\* \* \* \* \*